Patented Oct. 20, 1925.

1,557,797

UNITED STATES PATENT OFFICE.

WILLIAM F. BOYSEN, OF BUFFALO, NEW YORK.

PROCESS FOR COMPACTING, BATTING, OR FELTING CELLULOSE FIBROUS MATERIALS OUT OF LIQUIDS.

Application filed April 19, 1920. Serial No. 374,869.

*To all whom it may concern:*

Be it known that I, WILLIAM F. BOYSEN, a citizen of the United States, and a resident of the city of Buffalo, in the county of Erie and State of New York, have invented a new and useful Improvement in a Process for Compacting, Batting, or Felting Cellulose Fibrous Materials Out of Liquids, of which the following is a specification, reference being had to the accompanying drawings, forming a part thereof.

My invention relates to an improvement in the art of compacting, batting or felting a combination of fibrous and adhesive or cementing materials into a solidly homogeneous mass for various uses, and has for its object a new process for the forming of abrasive blocks and wheels, artificial lumber, boards, sheets or fabric and the like, either pliable or stiff, and in any desirable shape or dimensions.

Another object is to obviate the difficulties met with in other methods of compacting or felting by pressure, and whereby an invariably even distribution of the composing materials is obtainable.

In the accompanying drawings I show one form of apparatus for forming materials in accordance with the herein described process.

Figure 1:
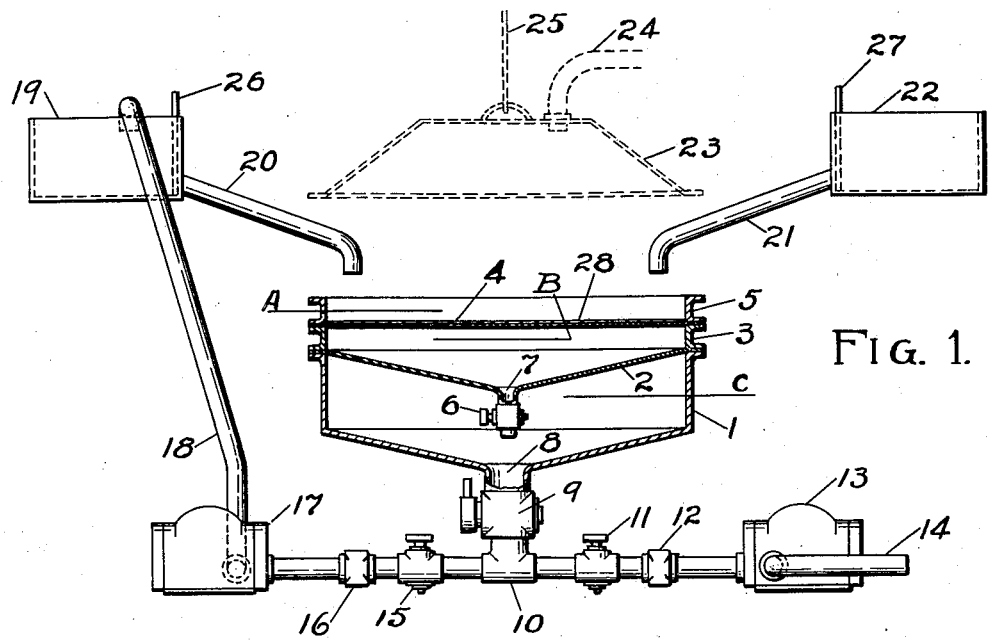
Figure 2:
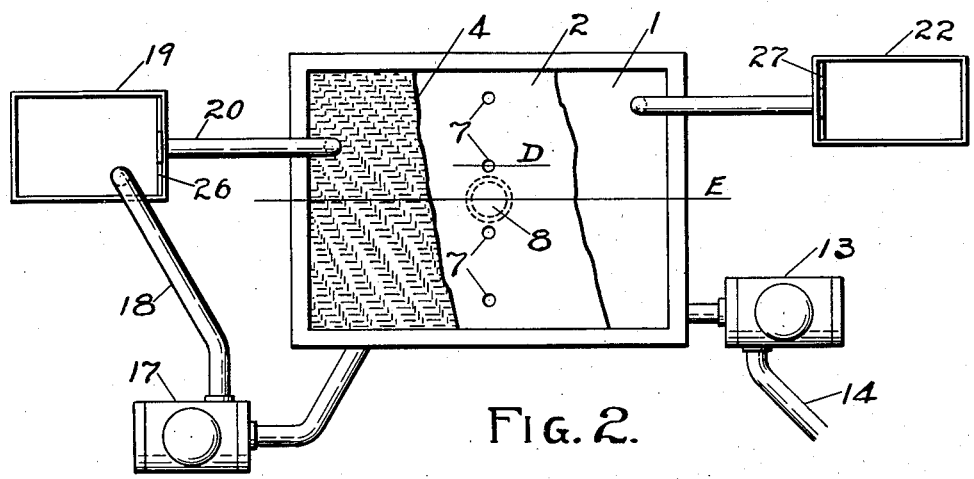

Figure 1 is an elevation of my apparatus for forming flat sheets, partly in section on lines D and E of Fig. 2, and with a cover shown in dotted lines. Fig. 2 is a plan of my apparatus with broken segments in the forming pan and vacuum chamber on the lines A, B and C of Fig. 1.

In Figs. 1, 5 and 3 are sections of the forming pan between which is held a perforated plate 4, and on which is a screen 28. The bottom of the forming pan is shown at 2, which is drained by the openings 7, 7, etc., each of which is controlled by a valve 6. 1 is a vacuum pan mounted below the bottom of the forming pan 2, and having an opening 8, controlled by a valve 9. Below valve 9 is a T, 10, one outlet of which leads to a vacuum pump, 13, through a shut-off valve, 11, and a check valve, 12; and the other outlet of which leads to a vacuum pump, 17, through shut-off valve 15 and check valve 16. 14 is a waste pipe from vacuum pump 13.

19 is a vat for holding the liquefied material to be fed to the forming pan, 5, through the pipe, 20, and which is returned from pump 17, through pipe 18 to said vat 19.

22 is a vat for holding the cementing or solidifying material in solution, having a pipe 21 leading to the forming pan 5.

26 and 27 are shut-off gates for vats 19 and 22 respectively.

23 is an air tight cover for the forming pan 5. 24 is an inlet pipe to the cover 23. When pipes 20 and 21 are swung out of the way the cover 23 is lowered on to the forming pan 5 by means of a cord 25.

Having thus described the apparatus or device used in my process, I proceed to its use as follows:

The vat 19 contains an acid solution such as a light compound of hydrochloric and sulphuric acids of proper strength to soften the cellulose fibrous material used, and this material is fed into the solution continuously while the operation is going on, and at the same time is being run out into the forming pan 5, together with a sufficient quantity of the solution to properly hold or carry the fibrous material in suspension.

When the forming pan 5 is filled with this liquid containing a pre-determined quantity of the fibrous material, the valve or valves 6 opening into the vacuum pan 1 are opened and all of the surplus solution extracted instantaneously and returned to the vat 19 by means of pump 17, for re-use, leaving the fibrous material upon the screen 28 above the perforated plate 4 properly compacted, batted or felted and ready for removal or further treatment.

It will be understood that a vacuum is maintained in the pan 1 by the pump 17, said vacuum being available and suddenly applied one or more times to extract the surplus solution and give the compacting blows as needed.

With the use of certain materials it may be necessary at this stage to use some chemical re-agent such as ammonia fumes, gas or vapor, to counteract the effects of the solution upon the fibrous materials, which is effected by fastening down the air-tight cover 23 over the forming pan 5 and drawing said chemical vapor, gas or fumes through the felted material by means of the vacuum pan 1, pump 13, and out through the waste pipe 14.

The moulding or forming pan 5 is then filled above the compacted or felted material with a previously prepared solution or mixture of any desired cementing, adhesive or solidifying material such as a thin shellac in liquid or semi-liquid form from the vat 22, and in the same manner the valve or valves 6, leading to the vacuum pan 1 opened and the solution drawn through the compacted fibrous material by pump 13 in such a manner that every particle will be impregnated with the cementing or solidifying material, while the surplus liquid is instantly extracted and discharged through waste pipe 14, leaving the material perfectly solidified so that it may be removed and the apparatus ready for another operation.

In forming articles by this process the action of the vacuum is such as to instantly create an air hammer, said air hammer increasing in force proportionately with the amount of vacuum obtained as expressed in inches. For example, if one inch of vacuum in the vacuum pan 1 is suddenly applied to the forming pan 5, a compacting blow of air is struck upon the material above the screen 28. Whereas, if a greater number of inches of vacuum is suddenly applied to the forming pan, a correspondingly greater compacting blow is struck. This compacts the material over the screen to an even thickness, and the operation is practically instantaneous.

What I claim is:—

1. The process of forming articles of fibrous material by extracting the liquid and compacting said material on a perforated former by means of a suddenly applied vacuum, the application of a chemical re-agent drawn through said fibrous material by said vacuum, and followed by the impregnating of said fibrous material by a final application of an adhesive and cementing material by means of said vacuum.

2. The process of forming articles of fibrous material which consists of depositing a liquid diffused pulp onto a perforated former, drawing the liquid down through and compacting said pulp on said former by means of a suddenly applied vacuum below said former, the application of a vapor re-agent drawn down through said pulp by said vacuum, depositing an adhesive compound onto said compacted pulp and drawing said compound through said pulp by a further application of a suddenly applied vacuum whereby said pulp is cemented.

3. The process of forming articles from cellulose fibrous material suspended in liquid, which consists of diffusing fibrous material in an acid solution, depositing a portion of said mixture in a form, draining said liquid from said mixture and leaving said fibrous material deposited in said form and the application of one or more compacting blows of air struck upon said deposited material by means of a vacuum.

4. The process of forming articles from fibrous material suspended in liquid, which consists of diffusing material in an acid solution, depositing said mixture in a form, draining said liquid from said mixture and returning said liquid to said solution and the application of one or more compacting blows of air struck upon the drained mixture by means of a vacuum.

5. The process of forming articles of fibrous material, which consists of diffusing fibrous material in an acid solution to form a mixture, running said mixture into a form, extracting the liquid from said mixture and depositing said material in said form, compacting said material by means of a vacuum, followed by the application of adhesive materials which are drawn through said fibrous material by another application of said vacuum.

6. The process of forming articles of fibrous material, which consists of diffusing fibrous material in an acid solution to form a mixture, running said mixture into a form, extracting the liquid from said mixture and depositing said fibrous material in said form by means of a vacuum followed by one or more compacting blows by means of said vacuum, and the application of a chemical re-agent drawn through said fibrous material by said vacuum.

In testimony whereof I have hereunto set my hand this 16th day of April, 1920.

WILLIAM F. BOYSEN.